United States Patent [19]

Livesay et al.

[11] 3,874,916

[45] Apr. 1, 1975

[54] MASK ALIGNMENT SYSTEM FOR ELECTRON BEAM PATTERN GENERATOR

[75] Inventors: William R. Livesay, Camarillo; Malcolm E. Wing, Agoura, both of Calif.

[73] Assignee: Radiant Energy Systems, Inc., Newbury Park, Calif.

[22] Filed: June 23, 1972

[21] Appl. No.: 265,558

[52] U.S. Cl. .................. 117/211, 117/212, 117/217, 117/218, 117/5.5, 117/45, 117/71 R, 156/15, 156/24, 118/504, 96/36.4, 96/38.3, 96/41

[51] Int. Cl. .......................... H05b 33/28, B44d 1/18

[58] Field of Search ............. 117/211, 217, 212, 45, 117/71 R, 218, 5.5; 156/15, 16, 24, 8; 118/504; 29/194, 195, 197, 198; 250/65 R; 96/35, 36 H, 38.3, 41

[56] References Cited

UNITED STATES PATENTS

| | | | |
|---|---|---|---|
| 2,748,288 | 5/1956 | Saulnier | 117/211 |
| 3,317,653 | 5/1967 | Layer | 117/212 |
| 3,443,915 | 5/1969 | Wood | 117/211 |
| 3,607,381 | 9/1971 | Fairbairn | 117/212 |
| 3,672,987 | 6/1972 | O'Keeffe | 117/211 |
| 3,742,229 | 6/1973 | Smith | 156/16 |

*Primary Examiner*—Michael F. Esposito

[57] ABSTRACT

A mask alignment system for electron beam pattern generators whereby an electron beam pattern may be repeatedly directed to a mask blank in an extremely accurate predetermined matrix pattern. In accordance with the invention a master mask is fabricated having a reference grid pattern thereon. This reference pattern is reproduced as an electrically conductive grid pattern on each electron sensitized mask blank for a mask set. Electrical connection is made to the grid pattern, when the mask blank is placed in an electron beam pattern generator, and controlled scanning of the beam is used to intercept the reference grid and provide an output signal current as the result thereof so as to allow correction of the electron beam pattern position for the error in position in the mask blank because of step and repeat inaccuracies in the X-Y positioner supporting the mask blank. Perfection in the master grid is not required since deviations from the true desired position will repeat throughout the mask set, so as to allow proper alignment of each mask in the mask set throughout the entire mask plane.

14 Claims, 13 Drawing Figures

MASK ALIGNMENT SYSTEM FOR ELECTRON BEAM PATTERN GENERATOR

BACKGROUND OF THE INVENTION

1. Field of the Invention

The present invention relates to the field of photomask fabrication by electron beam pattern generators, and particularly to such photomask fabrication as is commonly used to provide repetitive matrices or arrays of extremely detailed and accurate circuit patterns for integrated circuit fabrication.

2. Prior Art

The present invention is particularly useful in the production of photomasks commonly used in integrated circuit fabrication processes, and therefore the prior art relating to such photomasks shall be described herein.

Integrated circuit fabrication generally uses a plurality of photomasking operations together with various other processing steps to achieve the finished semiconductor device. Typically, a single cystal silicon is grown and then sliced along the desired cyrstal plane and polished to provide a silicon wafer on the order of ten to twenty thousandths of an inch thick and one and one-half to two inches in diameter. A layer of silicon oxide is provided on the surface of the wafer and is coated with a thin layer of photoresist material. The photoresist is exposed to a repetitive array of circuit patterns and then processed so as to leave only the exposed (or unexposed) portion of the photoresist material. Thus, portions of the oxide layer are not covered by the photoresist material and may be etched away to expose the silicon wafer with the remaining patterned photoresist protecting the immediately underlying oxide from the etchant. Thereafter the remaining photoresist is dissolved away and impurities may be diffused into the exposed areas of the silicon wafer to create regions of a desired conductivity type within the predetermined conductivity type wafer (with the patterned oxide layer resisting diffusion into the underlying substrate). The formation of a new oxide layer over the entire surface of the substrate completes this processing step. A subsequent series of similar steps using additional masks from a particular mask set, creates additional functional areas in the semiconductor wafer in cooperative relationship to those created in the first step, with a final metalization layer being patterned in a similar manner so as to interconnect the circuit and provide circuit contacts by contact of the metalization layer with selected regions of the silicon wafer through windows etched in the oxide layer. After these steps have been completed, the plurality of integrated circuits fabricated on the semiconductor wafer are appropriately separated by dicing the wafer so as to provide the finished individual integrated circuit, each being on the order of fifty to two hundred thousandths of an inch on a side.

The circuit patterns on the individual masks are of extremely fine detail, the present state of the art providing edge definitions to within approximately 10 micro inches with conductor line widths on the order of a hundred micro inches. The masks are created by first laying out a single individual mask pattern on a greatly expanded scale, such as by way of example, two hundred to a thousand times actual size, and subsequently photoreducing the mask pattern to the desired size. At some stage of the process, either after final reduction or at an intermediate stage of reduction, the pattern is repeatedly exposed in a matrix pattern by use of a step and repeat camera so as to create the desired matrix or array of individual circuit patterns for the final photomask. Thus, it is apparent that the accuracy in position of each circuit pattern with respect to each other circuit pattern in the matrix of patterns is determined by the mechanical accuracy of the step and repeat camera, and further (and most importantly) the accuracy in position of each circuit pattern in one mask of the mask set with relation to the respective circuit pattern in the other masks of the mask set is detemined by the repeatability of the step and repeat camera, and is limited by the inherent capabilities of such mechanical devices.

To generate photomasks by automatic means, electron beam pattern generators have recently been developed which expose the desired pattern under some form of automatic control for the sweep of an electron beam directed onto an electron sensitive surface. Patterns of high accuracy and resolution may be generated in this manner, and by the use of computer control the hand lay up of each pattern in the enlarged scale and the various photoreduction steps are eliminated. However, since the range of deflection of an electron beam over which accuracy and linearity may be maintained within the requirements of the semiconductor industry is limited, the same general step and repeat exposure process is used by stepping the mask blank to a new position for exposure of each electron beam pattern in the pattern matrix.

To aid in overcoming the above step and repeat limitations, alignment or reference marks have been placed on the mask blank which may be scanned with an electron beam after each step of the mask blank so as to sense the true position of the mask blank and correct the position of electron beam projection with respect thereto, thereby more accurately positioning each pattern in the matrix. In the prior art this has been accomplished by locating individual alignment marks in some pattern on a mask blank and scanning the alignment marks after each step to sense the true position. The alignment marks are selected in character so as to provide a change in either the secondary electron emission with respect to the secondary electron emission of the neighboring substrate, or to provide a characteristically different magnitude of backscatter in the impinging electrons (or both), so as to provide a detectable signal in an appropriately disposed sensor adjacent to beam and above the mask blank.

Characteristically, the alignment marks are positioned under resist layers and other materials required to sensitize the substrate. Thus, poor resolution will result, in the case of secondary electron sensing, due to loss of effective contrast between the alignment mark and the background substrate and due to scattering of the backscattered beam which creates secondary electrons through the various layers above the alignment mark. In the case of backscattered electrons, poor resolution would result for the above reasons and for the further reason that the backscattering is a directional characteristic, e.g. a reflection of impinging electrons, making the signal detected dependent not only on the magnitude of the backscatter, but more precisely upon the magnitude of the backscatter which happens to be directed specifically toward the sensor. Furthermore, difficulty is encountered in providing detectors in close oximity to the beam in order to collect an apprecia-e alignment current.

There is therefore a need for a simple and reliable stem for accurately, and particularly repeatably, igning an electron beam pattern in an electron beam ttern generator to provide the effective step and re-at accuracy and repeatability for a mask set which is herently consistent with the accuracy of individual tterns generatable by such pattern generators.

BRIEF SUMMARY OF THE INVENTION

A mask alignment system for electron beam pattern nerators whereby an electron beam pattern may be peatedly directed to a mask blank in an extremely ac-rate predetermined matrix pattern. In accordance th the invention a master mask is fabricated having eference grid pattern thereon. This reference pattern reproduced as an electrically conductive grid pattern ı each electron sensitized mask blank for a mask set. ectrical connection is made to the grid pattern, when e mask blank is placed in an electron beam pattern nerator, and controlled scanning of the beam is used intercept the reference grid and provide an output ;nal current as the result thereof so as to allow cor-ction of the electron beam pattern position for the ror in position in the mask blank because of step and peat inaccuracies in the X-Y positioner supporting e mask blank. Perfection in the master grid is not re-iired since deviations from the true desired position ll repeat throughout the mask set, so as to allow oper alignment of each mask in the mask set through-ıt the entire mask plane. For the fabrication of a mask ing an electrically conductive masking material such chromium, a layer of electron resist is provided over e chromium coated surface of the mask blank and the ınductive grid is formed by vapor deposition and ching of a metal layer over the electron resist. For the brication of masks using nonconductive masking ma-rials, such as silicon or conventional metal, metal-ılide emulsions, the conductive grid pattern may be rmed by directly depositing a layer of metal onto the ask layer, which is subsequently coated with an elec-ɔn resist and preferably with a final thin layer of metal as to provide a means for preventing static charge ıildup in the regions of the mask blank between the ınductive portions of the grid pattern.

BRIEF DESCRIPTION OF THE DRAWINGS

FIG. 7 is a cross-section of the mask blank of FIG. 6 ter the layer of aluminum has been etched to form the pattern defined by the patterned layer of resist of FIG. 6 and after the resist has been entirely removed there-from.

DETAILED DESCRIPTION OF THE INVENTION

The present invention is applicable to the fabrication of photomasks of the type used for semiconductor integrated circuit fabrication having either an electrically conductive masking material, such as chromium, or an electrically nonconductive masking material, such as silicon and the conventional metal, metal-halide emulsion materials. Thus, for purposes of explanation, the present invention shall be first described with respect to the method of making and using a typical mask of the first type, that is, specifically a chromium mask, and thereafter an explanation of a variation in the method and use shall be presented with respect to mask having nonconductive masking materials. Also, it shall be assumed in the following discussion that the sensitized materials, whether photosensitive materials or electron sensitive materials (resists) result in the production of a positive pattern when a mask is used in the formation of that pattern. Thus, when a layer of material to be formed in a pattern is covered with a resist and exposed through a mask, the exposed areas are subsequently dissolved away, allowing the etching of the material which was immediately under the exposed areas, to ultimately leave the material which had been directly under the opaque areas of the mask, thereby providing a positive print of the mask image. It is to be understood, however, that various types of resist materials are commercially available (e.g., both positive and negative types of materials) which may be used with the present invention with only incidential and obvious variation of the procedure, hereafter described, to account for the positive to negative and negative to positive printing characteristics of some of these alternate materials. Well known electron resists are described in the following articles: High resolution Positive Resists for Electron-beam Exposure by I. Haller, M. Hatzakis and Strinivasan, IBM Journal, May 1968, pages 251–256. *Polymeric Electron Beam Resists* by H. Y. Ku and L. C. Scala, J. Electrochem. Soc.: SOLID STATE SCIENCE, July 1969, pages 980–985; and *Electron-Sensitive Materials* by Barrett Broyde, The Bell System Technical Journal, November, 1970, pages 2095–2104.

Figure 1:
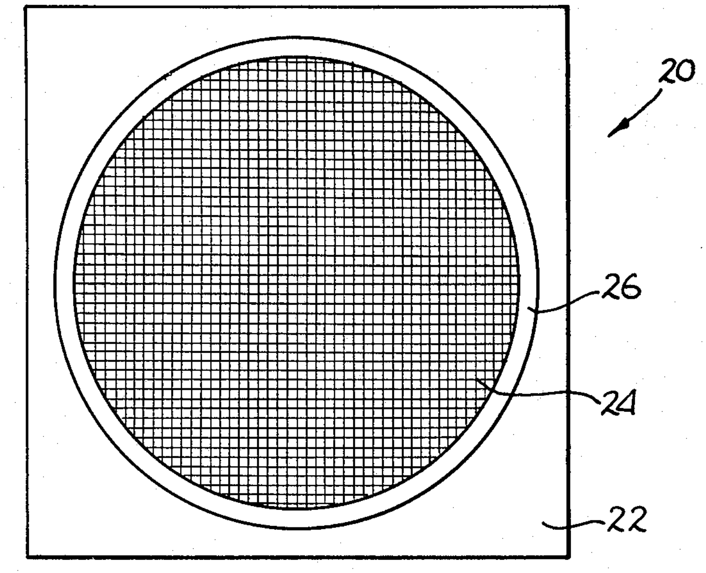
FIG. 1 is a perspective view of a master mask for use the fabrication of the mask blanks of the present in-ntion.

The first step in fabrication of the mask of the present invention is to provide a master mask for the creation of the desired matrix outline on the final mask. Thus, as seen in FIG. 1, a mask generally indicated by the numeral 20 is provided for purposes of defining an interconnected grid pattern separating regions of appropriate size for embodying the circuit patterns for the semiconductor device to be fabricated with the mask. The mask preferably is formed on a glass plate 22, typically 2 inches by 2 inches, and is characterized by an orthogonal grid pattern 24 of final lines interconnected with each other and connected at least at some point to a significant area, the purposes of which will become subsequently apparent. Thus, in FIG. 1, an annular region 26 is provided encompassing and integral with the periphery of the pattern of lines 24. The master mask may be fabricated using substantially any mask fabricating technique such as in conventional photo masks, chromium masks, etc., and is particularly easily fabricated using an electron beam pattern generator to expose an electron resist to form the pattern because of the simplicity of the pattern and small aggregate area being exposed. Subsequent "master" masks may then be fabricated using an electron image projection system if a photo cathode mask is once fabricated.

Figure 2:
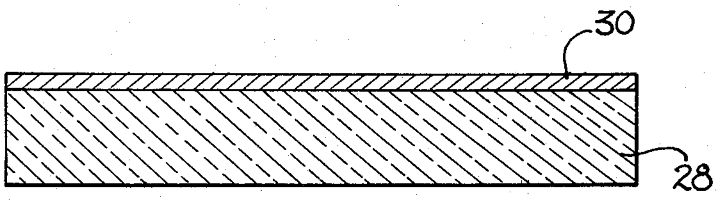
FIG. 2 is a cross-section of a typical mask blank using conductive masking material.

The next step in the fabrication of the mask of the present invention is to provide a plurality of appropriate mask blanks from which one or more mask sets are to be fabricated. For a chromium mask, the mask blank will, in general, be comprised of a 2 inch by 2 inch glass plate or substrate with a layer of chromium deposited to one surface thereof. Thus, the cross-section of these mask blanks will be as shown in FIG. 2, being comprised of a glass substrate 28 with a thin layer of chromium 30 deposited thereto. Chromium masks and the blanks from which chromium masks are fabricated are well-known in the prior art, so that the method of providing the basic mask blank of FIG. 2 shall not be further described herein.

Figure 3:
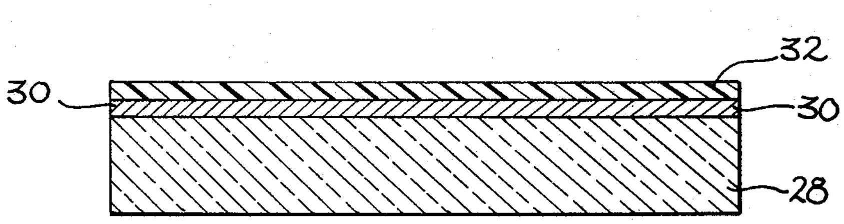
FIG. 3 is a cross-section of a mask blank of FIG. 2 ter it has been coated with a layer of electron resist.
Figure 4:
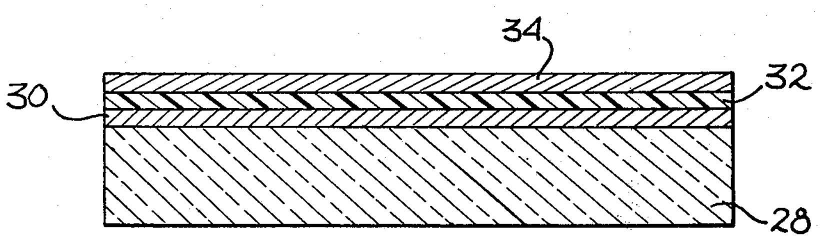
FIG. 4 is a cross-section of the mask blank of FIG. 3 ter the blank has been further coated with a layer of etal.

The next step in the fabrication of the mask is to coat the substrate of FIG. 2 with a coating of electron resist 32 as shown in FIG. 3. Electron resists are also well-known in the prior art and have been used with prior art electron pattern generators, both of the electron beam and of the electron image projection system type. The next step in the fabrication is to coat the electron resist 32 with a layer of suitable conductor material 34, as shown in FIG. 4. Typically, metals such as aluminum, molybdenum and the like are used for this layer, and may be readily deposited to the electron resist layer 32 by conventional vapor deposition techniques whereby the substrate, and more importantly the electron resist layer, may be maintained relatively cool throughout the deposition process so as to prevent deterioration of the resist layer. Thus, the structure of the mask blanks at this stage of fabrication, as shown in FIG. 4, is characterized by a conductive layer 30 (which is to become the patterned layer in the final mask) deposited to a substrate 28, with a second conductive layer 34 deposited over, but electrically insulated from, the first conductive layer 30 by the intermediate layer 32.

Figure 5:
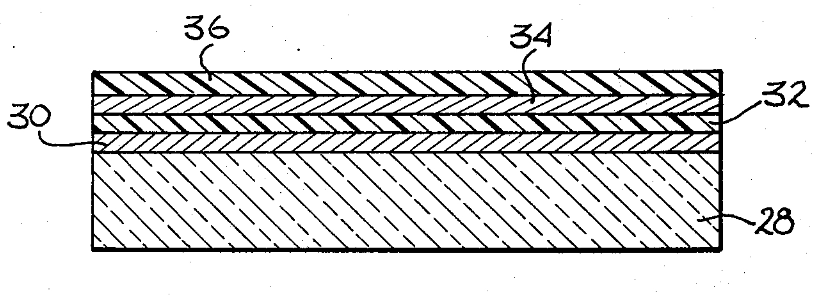
FIG. 5 is a cross-section of the mask blank of FIG. 4 ter the blank has been further coated with a layer of ıotoresist.

The next step is to coat the substrate with a further sensitized layer, which in the preferred embodiment is a photosensitive layer 36 as shown in FIG. 5. Thereupon the mask blanks are exposed to the master mask 20 of FIG. 1 to expose the sensitized layer 36 to the grid pattern of the master mask. Upon development and the rinsing away of the exposed areas of the sensitized layers 36, there remains a pattern of photoresist material duplicating the image on the master mask 24, as shown in the cross-section of FIG. 6. By etching away the exposed areas of the conductive layer 34, and subsequently dissolving away the pattern layer 36 shown in FIG. 6, there results the structure shown in FIG. 7, specifically a patterned conductive layer 34 disposed on the electron resist layer 32 over a chromium layer 30 on the substrate 28. The patterned conductive layer 34 is a duplication of the image on the master mask 20.

Figure 7:
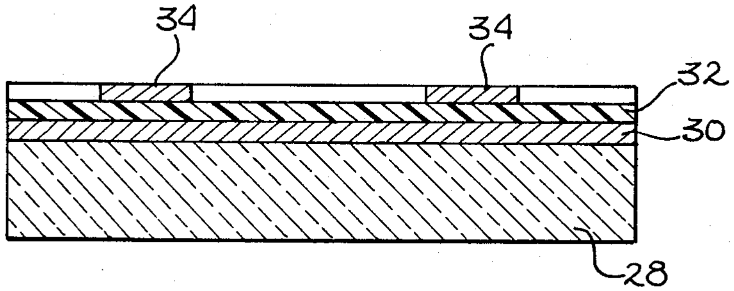
Figure 8:
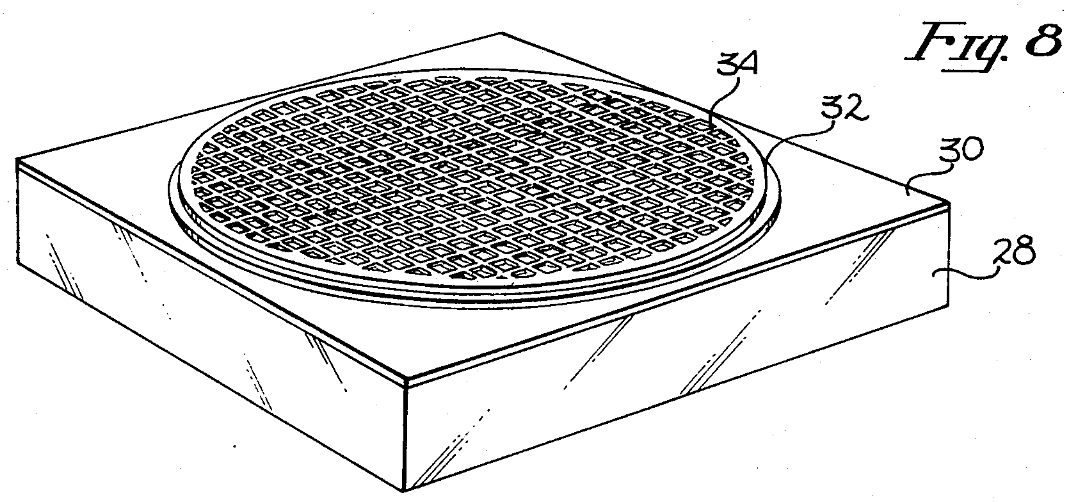
FIG. 8 is a perspective view of the mask of FIG. 7.
Figure 9:
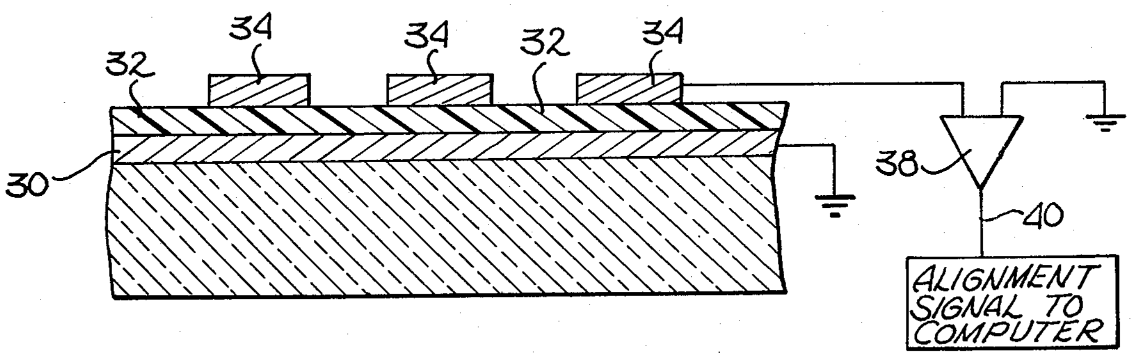
FIG. 9 is a schematic diagram representing the manner of electrical connection of the mask blank of FIG. 8 when mounted in an electron beam pattern generator.

Referring to FIG. 8, a perspective view of a portion of the mask blank of FIG. 7 may be seen, whereby the various layers and the electrically conductive grid pattern may be seen. Preferably the electron resist layer 32 does not extend into the edge or corner regions of the mask area, so as to leave unexposed in this regions the layer of chromium on the glass substrate. Thus, the completed mask blank is characterized by a glass substrate, a layer of chromium on one surface thereof at least a portion of which is not covered by any other layer so as to allow making electrical contact thereto, a layer of electron resist over the layer of chromium in the area of the mask blank on which the mask will be formed, and a patterned layer of metal defining a matrix or grid pattern on the electron resist layer and electrically insulated from the layer of chromium. To use the mask blank for the fabrication of the desired mask, the mask blank is placed in the electron beam pattern generator, typically of a type operated under computer control so that the computer may cause the deflection of the electron beam to expose the electron resist in accordance with the circuit pattern desired. In such apparatus, the electron beam is deflected so as to create a single circuit pattern and then the item on which the pattern is being generated is mechanically stepped to the next matrix position and the pattern reexposed in that area. The mask blank of the present invention is placed in the electron beam pattern generator in such a manner so as to provide electrical contact with the layer of chromium and also the pattern layer of metal on the electron resist, as shown in FIG. 9. Thus, when the mask blank is first loaded into the electron beam pattern generator, and each time the mask blank is stepped to a new position for exposure of a subsequent circuit pattern in the matrix, the electron beam may be first caused to scan the approximate location of the grid lines surrounding the specific mask blank area on which the next pattern will be projected. When the electron beam intercepts the grid pattern 34, a current will be detected as a result thereof, which is amplified by amplifier 38. The amplifier operates as a sort of threshold detector to provide a 0 or 1 output to provide a logic signal to the computer connected to line 40 so as to indicate thereto, when the beam is impinging on the grid pattern. When the electron beam is deflected so as to not intercept the conductive grid pattern 34, no signal is provided to the amplifier 38, but instead the electron beam tends to penetrate the electron resist layer 32 and be drained off by the grounding of the chrome layer 30, thereby preventing the buildup of large static charges in the resist layer. Of course, the impingement of the electron beam on the resist layer exposes the resist layer. However, since the mask blank may be mechanically stepped to a position very close to the desired position, the extent of electron beam scanning required for alignment purposes is very small (as are the width of the conductors in the grid pattern 34) so that the proportion of the mask area required to be devoted to the grid pattern and to the electron beam scanning to sense the true position of the grid pattern is small. Also, it is to be noted that various techniques for accomplishing the desired sweeping and interpreting the information provided on line 40, together with the simultaneous information on the instantaneous beam position, may be used to determine the exact grid pattern position with respect to the beam deflection. Scanning schemes in general are well-known in the prior art and typically are comprised of a repetitive sweeping of the scanning means across the object to be detected, so as to locate not just the object itself, but the edges thereof, to obtain and extremely accurate indication of its position. X-Y position as well as angular position may be sensed and corrected by mechanically moving the mask blank, by providing a correction signal to the beam deflection to deflect the beam in accordance with the true position of the mask blank, or by other means, such as by way of example, a combination of the foregoing.

Thus, it may be seen that the grid pattern defining the enclosure surrounding an area of the mask on which a circuit pattern is to be projected is first scanned so as to determine the true position of the mask area to allow the extremely accurate projection or generation of the circuit pattern in that area. Once all of the areas of the matrix have been exposed to the circuit pattern, the remaining processing of the mask blank proceeds in accordance with the prior art techniques. It may be seen that the resulting mask, in addition to having a matrix of circuit patterns thereon, will also generally have the grid pattern defined by the conductive pattern 34, since the conductive pattern protected the underlying resist from the electron beam impingement. While the grid pattern may not itself be extremely accurate, the grid pattern will be substantially identical on each mask of a mask set since it was created by use of a common master so that the inaccuracies therein will be accurately produced on each mask. Consequently, when integrated circuit devices are fabricated through the use of these masks, each mask in the mask set may be extremely accurately aligned with the pattern generated by a previously used mask of the mask set, since alignment of the mask patterns over the entire mask plane to an extremely high degree of accuracy, is easily achieved provided certain reference points on each mask (circuit pattern or special reference marks placed on the mask for this purpose) are aligned with respect to the areas on the substrate resulting from corresponding areas on the previous mask. Thus, the accuracy of the mask overlay is achieved, not by achieving extreme accuracy in any one mask, but by very accurately causing a repetition of the same positional inaccuracies in each mask of the mask set.

In the above description, it was indicated that each pattern is generated within a particular area of the grid pattern. However, this is not to imply a necessary limitation in this regard. Thus, if grid lines of approximately 500 angstroms thick are used, proper grid position sensing may be achieved (in a nonfunctional area), while a pattern generating beam will adequately penetrate the grid lines to expose the electron resist thereunder with very little beam dispersion. Therefore, circuit patterns may span one or more grid lines, if necessary.

Figure 10:
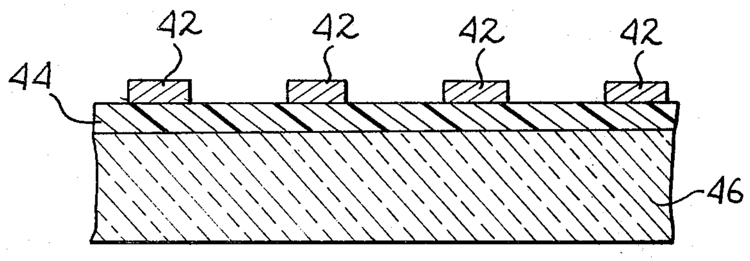
FIG. 10 is a cross-section of an alternate embodiment of the mask blank of the present invention as it would be fabricated using electrically insulative masking materials.
Figure 11:
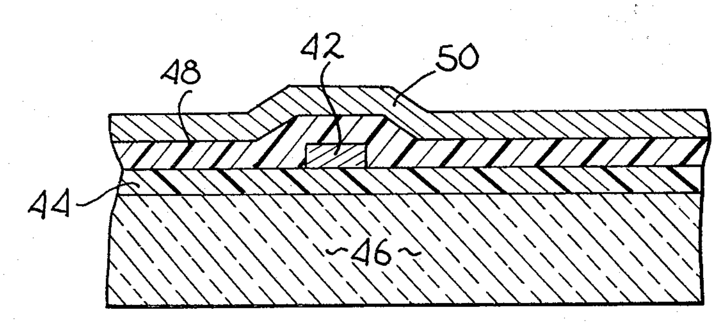
FIG. 11 is a cross-section of the completed mask blank of the alternate embodiment of FIG. 10.

In the fabrication of masks having an electrically nonconductive masking material, such as silicon or the conventional metal, metal-halide emulsion masks, the above technique should be altered slightly. Specifically, since the mask layer is nonconductive and the mask substrate characteristically is nonconductive, the only conductive regions resulting from the above process would be the grid pattern created by the master mask. Thus, there would be no convenient means for readily draining off the static charges which may otherwise build up in the electron resist, in the layer of mask material, and in the substrate itself. (The tendency of the static charges to leak off through the grid pattern may tend to interfere with the signal desired therefrom.) Also, since the mask material is nonconductive, the conductive grid pattern may be placed immediately thereon, rather than over a layer of electron resist on the mask material. Thus, the first step in generating the mask blank of the present invention using a nonconductive masking material is to create a conductive grid pattern 42, using the master mask, on top of the masking layer 44 on the mask substrate 46, as shown in FIG. 10. Thereafter, as shown in FIG. 11, a layer 48 of electron resist is placed over the grid pattern and a final thin layer of metal, typically aluminum, is placed over the top surface of the electron resist. The layer of metal 50, typically vapor deposit, is preferably very thin, and is for the purpose of providing a conductive covering to bleed off any static charges which might otherwise accumulate in the mask conductive regions. By keeping the layer of metal 50 very thin, the layer will not significantly interfere with the electron beam incident thereto and will allow the substantially free passage of the electron beam into the electron resist and/or onto the conductive grid 42, as the case may be.

As before, when the mask blank is placed in the electron beam pattern generator, electrical connection is made to the grid pattern 42 and to the conductive layer 50, the grid pattern 42 being coupled to amplifier 38 which provides the signal on line 40 to the computer as herebefore described. The electrical connection to layer 50 may be directly to ground or, as an alternate, may be coupled to amplifier 52 to provide an output signal on line 54 indicative of the beam current so as to provide a monitoring and/or a control capability.

Figure 13:
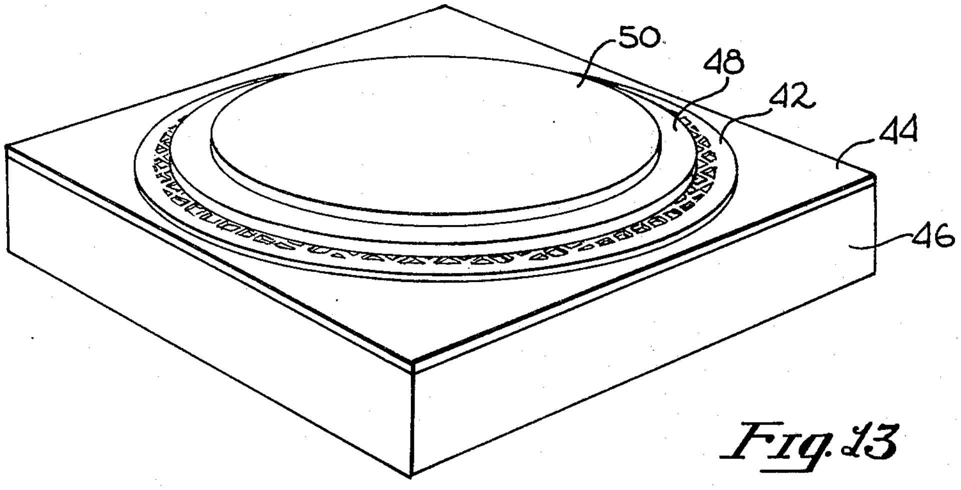
FIG. 13 is a perspective of the mask blank of FIG. 12.

Thus, the finished mask blank using a nonconductive masking material is as shown in FIG. 13. Typically, the substrate 46 is entirely coated on one surface thereof with the mask layer 44. The conductive pattern is disposed over the masking layer 44, with the resist layer 48 disposed over less than all of the conductive region so as to allow electrical contact thereto, and the final layer of metal 50 being disposed over the central area of the electron resist layer 48 so as to be accessable for electrical connection thereto, but electrically insulated from the conductive grid pattern 42.

Figure 12:
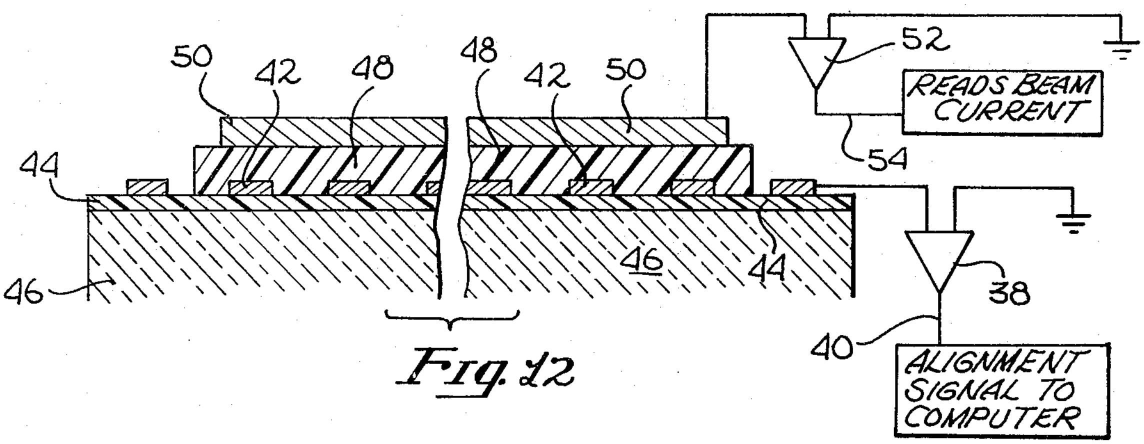
FIG. 12 is a schematic diagram illustrating the electrical connection of the mask blank of FIGS. 10 and 11 when mounted in an electron beam pattern generator.

As a result of the mask blanks of the present invention and the manner of use thereof, fast, simple, accurate and reliable alignment of the electron beam image with respect to the mask blank in an electron beam pattern generator may be achieved, and extremely accurate mask overlay is achieved as a result of the use of a master mask for producing the conductive grid pattern on each mask of a mask set. Problems in regard to sensor location, (e.g., secondary electron or backscatter sensors) electron scattering, and poor "contrast" between the alignment marks and the background substrate, as well as electronic problems arising from the very low signal levels, noise, etc., have been eliminated in the present invention. Furthermore, if the conductive grid pattern, such as by way of example, the conductive grid pattern 42 of the mask blank of FIG. 12, is left on the mask after the mask has been completed, the grid pattern will tend to space the finished mask a slight distance away from the semiconductor wafer so as to reduce the abrasion between the wafer and the functional areas of the mask. This is achieved without significantly detracting from ones ability to align a mask in the mask set with the pattern on a semiconductor wafer created as a result of the prior use of a mask in the same mask set, and without detracting from the pattern definition on the photoresist. Also, while the principles of the present invention have been specifically described herein in relation to electron beam pattern generators, the invention is also directly applicable to electron image projection systems since techniques are well known in such systems for providing for the scanning of reference masks on the target by one or more beams prior to projecting the electron image onto the target, aligned with respect thereto as a result of the prior scanning. Thus, while the invention has been particularly shown and described with reference to two embodiments thereof, it will be understood by those skilled in the art that various changes in form and details may be made therein without departing from the spirit and scope of the invention.

We claim:

1. A mask blank from which a photomask may be produced for use in integrated circuit fabrication processes, said mask blank comprising:
- a transparent, electrically nonconductive substrate for supporting a photomask;
- a first layer of electrically conductive metal masking material on one surface of said substrate;
- a second layer of electron sensitized material over said first layer; and
- a third layer of electrically conductive metal material over said second layer, said third layer being patterned to form a repetitive, electrically interconnected pattern in the interstices between areas for formation of a matrix of circuit patterns.

2. The mask blank of claim 1 wherein said substrate is glass.

3. The mask blank of claim 2 wherein said electrically conductive masking material is chromium.

4. A mask blank from which a photomask may be produced for use in integrated circuit fabrication processes, said mask blank comprising:
- a transparent, electrically nonconductive substrate for supporting a photomask;
- a first layer of electrically nonconductive masking material on one surface of said substrate;
- a second layer of electrically conductive metal material over said first layer, said second layer being patterned to form a repetitive, electrically interconnected pattern in the interstices between areas for formation of a matrix of circuit patterns; and
- a third layer of electron sensitized material over said second layer.

5. The mask blank of claim 4 further comprised of a fourth layer of electrically conductive metal material over said third layer, said fourth layer being electrically insulated from said second layer.

6. The mask blank of claim 5 wherein said substrate is glass.

7. The mask blank of claim 6 wherein said first layer is silicon.

8. A combination for detecting the position of a mask blank in an electron beam pattern generator, comprising:
- a mask blank having
  - a transparent electrically nonconductive substrate for supporting a photomask,
  - a first layer of electrically conductive metal masking material on one surface of said substrate,
  - a second layer of electron sensitized material over said first layer, and
  - a third layer of electrically conductive metal material over said second layer, said third layer being patterned to form a repetitive, electrically interconnected pattern in the interstices between areas for formation of a matrix of circuit patterns; and
- means for making electrical contact with said third layer to sense the presence of an electron beam current impinging thereon.

9. A combination as set forth in claimm 8, further comprising means for electrically coupling said first layer to a predetermined voltage.

10. A combination for detecting the position of a mask blank in an electron beam pattern generator, comprising:
- a mask blank having
  - a transparent, electrically nonconductive substrate for supporting a photomask,
  - a first layer of electrically nonconductive masking material on one surface of said substrate,
  - a second layer of electrically conductive metal material over said first layer, said second layer being patterned to form a repetitive, electrically interconnected pattern in the interstices between areas for formation of a matrix of circuit patterns,
  - a third layer of electron sensitized material over said second layer, and
  - a fourth layer of electrically conductive material over said third layer, said fourth layer being electrically insulated from said second layer; and
- means for making electrical contact with said second layer to sense the presence of an electron beam current impinging thereon.

11. A combination as set forth in claim 10, further comprising means for electrically coupling said first layer to a predetermined voltage.

12. A mask blank from which a photomask may be produced for use in integrated circuit fabrication processes, said mask blank comprising:
- a transparent, electrically nonconductive substrate for supporting a photomask;
- a layer of masking material over a first surface of said substrate; and
- a patterned layer of electrically conductive metal material over said first surface and disposed to form a repetitive, electrically interconnected pattern defining areas of a matrix of circuit patterns to be formed, said patterned layer being electrically insulated from all other electrically conductive materials on said mask blank.

13. The mask blank of claim 12, further including at least one additional, substantially continuous layer of electrically conductive metal material electrically insulated from said patterned layer.

14. A combination for detecting the position of a mask blank in an electron beam pattern generator, comprising:
 a mask blank having
  a transparent, electrically nonconductive substrate for supporting a photomask,
  a layer of masking material over a first surface of said substrate,
  a patterned layer of electrically conductive metal material over said first surface and disposed to form a repetitive, electrically interconnected pattern defining areas of a matrix of circuit patterns to be formed, said patterned layer being electrically insulated from all other electrically conductive materials on said mask blank, and
  at least one additional, substantially continuous layer of electrically conductive metal material electrically insulated from said patterned layer;
 means for establishing electrical contact with said patterned layer to detect the presence of an electron beam current impinging thereon; and
 means for establishing electrical contact with said additional, substantially continuous layer to determine the voltage on said layer.

* * * * *

UNITED STATES PATENT OFFICE

CERTIFICATE OF CORRECTION

PATENT NO. : 3,874,916

DATED : April 1, 1975

INVENTOR(S) : William R. Livesay et al.

It is certified that error appears in the above-identified patent and that said Letters Patent are hereby corrected as shown below:

Column 1, line 21, "cystal" should be -- crystal --;
line 22, "cyrstal" should be -- crystal --.

Column 2, line 12, "detemined" should read -- determined --.

Column 3, which has up to two characters missing from the beginning of each line, should read as follows:

"-- proximity to the beam in order to collect an appreciable alignment current.

There is therefore a need for a simple and reliable system for accurately, and particularly repeatably, aligning an electron beam pattern in an electron beam pattern generator to provide the effective step and repeat accuracy and repeatability for a mask set which is inherently consistent with the accuracy of individual patterns generatable by such pattern generators.

BRIEF SUMMARY OF THE INVENTION

A mask alignment system for electron beam pattern generators whereby an electron beam pattern may be repeatedly directed to a mask blank in an extremely accurate predetermined matrix pattern. In accordance with the invention a master mask is fabricated having a reference grid pattern thereon. This reference pattern is reproduced as an electrically conductive grid pattern on each electron sensitized mask blank for a mask set, electrical connection is made to the grid pattern, when the mask blank is placed in an electron beam pattern generator, and controlled scanning of the beam is used to intercept the reference grid and provide an output signal

UNITED STATES PATENT AND TRADEMARK OFFICE

CERTIFICATE OF CORRECTION

PATENT NO. : 3,874,916

DATED : April 1, 1975

INVENTOR(S) : William R. Livesay et al.

It is certified that error appears in the above-identified patent and that said Letters Patent are hereby corrected as shown below:

current as the result thereof so as to allow correction of the electron beam pattern position for the error in position in the mask blank because of step and repeat inaccuracies in the X-Y positioner supporting the mask blank. Perfection in the master grid is not required since deviations from the true desired position will repeat throughout the mask set, so as to allow proper alignment of each mask in the mask set throughout the entire mask plane. For the fabrication of a mask using an electrically conductive masking material such as chromium, a layer of electron resist is provided over the chromium coated surface of the mask blank and the conductive grid is formed by vapor deposition and etching of a metal layer over the electron resist. For the fabrication of masks using nonconductive masking materials, such as silicon or conventional metal, metal halide emulsions, the conductive grid pattern may be formed by directly depositing a layer of metal onto the mask layer, which is subsequently coated with an electron resist and preferably with a final thin layer of metal so as to provide a means for preventing static charge buildup in the regions of the mask blank between the conductive portions of the grid pattern.

BRIEF DESCRIPTION OF THE DRAWINGS

FIG. 1 is a perspective view of a master mask for use in the fabrication of the mask blanks of the present invention.

FIG. 2 is a cross-section of a typical mask blank using a conductive masking material.

UNITED STATES PATENT AND TRADEMARK OFFICE

CERTIFICATE OF CORRECTION

PATENT NO. : 3,874,916

DATED : April 1, 1975

INVENTOR(S) : William R. Livesay et al.

It is certified that error appears in the above-identified patent and that said Letters Patent are hereby corrected as shown below:

FIG. 3 is a cross-section of a mask blank of FIG. 2 after it has been coated with a layer of electron resist.

FIG. 4 is a cross-section of the mask blank of FIG. 3 after the blank has been further coated with a layer of metal.

FIG. 5 is a cross-section of the mask blank of FIG. 4 after the blank has been further coated with a layer of photoresist.

Figure 6:
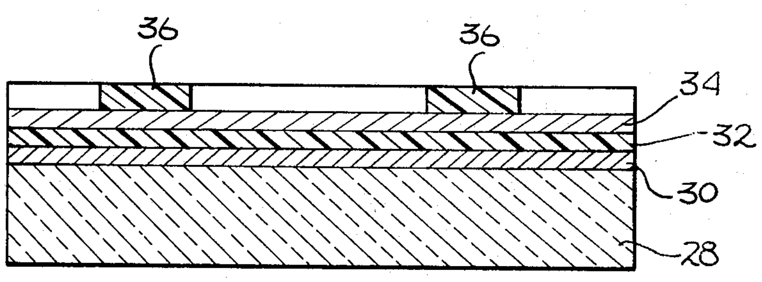
FIG. 6 is a cross-section of the mask blank of FIG. 5 ter the photoresist layer has been exposed to the mas-r mask of FIG. 1 and developed so as to leave only a ıtterned layer of photoresist.

FIG. 6 is a cross-section of the mask blank of FIG. 5 after the photoresist layer has been exposed to the master mask of FIG. 1 and developed so as to leave only a patterned layer of photoresist.

FIG. 7 is a cross-section of the mask blank of FIG. 6 after the layer of aluminum has been etched to form the --".

Column 4, lines 54 and 55, the title "High Resolution Positive Resists for Electron-beam Exposure", should be italicized;

Line 56, "Strinivasan" should read -- R. Srinivasan --.

Column 6,
line 48, "0 or 1" should read -- "0" or "1" --.

Column 10, line 21, "claimm" should read -- claim --.

Signed and Sealed this

*eighth* Day of *June 1976*

[SEAL]

*Attest:*

RUTH C. MASON
*Attesting Officer*

C. MARSHALL DANN
*Commissioner of Patents and Trademarks*